US012347959B2

(12) United States Patent
Nakai

(10) Patent No.: US 12,347,959 B2
(45) Date of Patent: Jul. 1, 2025

(54) CONNECTOR

(71) Applicant: YAZAKI CORPORATION, Tokyo (JP)

(72) Inventor: Satoshi Nakai, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 368 days.

(21) Appl. No.: 17/965,766

(22) Filed: Oct. 14, 2022

(65) Prior Publication Data

US 2023/0119180 A1 Apr. 20, 2023

(30) Foreign Application Priority Data

Oct. 19, 2021 (JP) ................................ 2021-171079

(51) Int. Cl.
*H01R 13/422* (2006.01)
*H01R 13/641* (2006.01)
*H01R 13/642* (2006.01)

(52) U.S. Cl.
CPC ......... *H01R 13/422* (2013.01); *H01R 13/641* (2013.01); *H01R 13/642* (2013.01)

(58) Field of Classification Search
CPC ... H01R 13/422; H01R 13/641; H01R 13/642
USPC .......................................................... 439/595
See application file for complete search history.

(56) References Cited

U.S. PATENT DOCUMENTS

2003/0027455 A1* 2/2003 Yamawaki ......... H01R 13/4223 439/595
2018/0175534 A1* 6/2018 Sugiyama .......... H01R 13/2464
2019/0363486 A1* 11/2019 Ochiai ................. H01R 13/635
2020/0373711 A1* 11/2020 Miyakawa ............. H01R 13/33
2020/0395706 A1* 12/2020 Ishikawa ............ H01R 13/4364
2021/0391668 A1 12/2021 Okayasu

FOREIGN PATENT DOCUMENTS

JP 2020-187918 A 11/2020

* cited by examiner

*Primary Examiner* — Christopher M Koehler
*Assistant Examiner* — Gregory L Mangot
(74) *Attorney, Agent, or Firm* — KENEALY VAIDYA LLP

(57) ABSTRACT

A connector includes: a terminal fitting; an electric wire connected to the terminal fitting; a first housing in which the terminal fitting is stored, the first housing constituting a fitting part with a counterpart connector; a seal member disposed so as to surround an outer periphery of the first housing; a front holder mounted on the first housing so as to prevent the seal member from coming out from the first housing; and a second housing including a short terminal, the short terminal being configured to allow a fitting state with the counterpart connector to be detected. The second housing is attached to the first housing and retained by the front holder in a state in which the second housing is displaceable in a direction intersecting a fitting direction with the counterpart connector in a posture in which the short terminal faces the counterpart connector.

7 Claims, 9 Drawing Sheets

CONNECTOR

CROSS-REFERENCE TO RELATED APPLICATIONS

This application is based on and claims priority under 35 USC 119 from Japanese Patent Application No. 2021-171079 filed on Oct. 19, 2021, the contents of which are incorporated herein by reference.

TECHNICAL FIELD

The present disclosure relates to a connector capable of detecting a fitting state with a counterpart connector.

BACKGROUND ART

JP2020-187918A discloses a connector in which a plate-shaped terminal fitting connectable to a device such as an inverter is stored in a housing. Such a connector is generally called a high-voltage connector.

SUMMARY OF INVENTION

A connector such as the high-voltage connector in the related art as described above may be designed to detect a fitting state between the connector and a counterpart connector from the viewpoint of safety or the like. For example, a small U-shaped terminal fitting (so-called short terminal) is embedded in the housing and the short terminal is brought into contact with a pair of electrodes in the counterpart connector at the time of fitting to form a short circuit, so that the fitting state can be detected. However, when an excessive positional deviation occurs between the shorting terminal and the electrodes of the counterpart connector due to a manufacturing tolerance or the like of the connector, there is a possibility that it becomes difficult to connect the shorting terminal to the electrodes of the counterpart connector even though the fitting itself is appropriately performed.

An object of the present disclosure is to provide a connector in which a short terminal can be easily aligned.

The present disclosure provides a connector including: a terminal fitting; an electric wire connected to the terminal fitting; a first housing in which the terminal fitting is stored, the first housing constituting a fitting part with a counterpart connector; a seal member disposed so as to surround an outer periphery of the first housing; a front holder mounted on the first housing so as to prevent the seal member from coming out from the first housing; and a second housing including a short terminal, the short terminal being configured to allow a fitting state with the counterpart connector to be detected, wherein the second housing is attached to the first housing and retained by the front holder in a state in which the second housing is displaceable in a direction intersecting a fitting direction with the counterpart connector in a posture in which the short terminal faces the counterpart connector.

The present disclosure is briefly described as above. Further, details of the present disclosure will be further clarified by reading through an embodiment of the present invention to be described below with reference to the accompanying drawings.

DESCRIPTION OF EMBODIMENTS

Embodiment

Hereinafter, a connector 1 according to an embodiment of the present disclosure will be described with reference to the drawings. The connector 1 shown in FIG. 1 functions as a relay connector that electrically connects a pair of electric wires 20 of the connector 1 and a counterpart connector (not shown) to be fitted to the connector 1. The connector 1 includes a short terminal 90 (see FIGS. 1, 3, etc.) configured to allow a fitting state with a counterpart connector to be detected. A specific function of the short terminal 90 will be described later.

Figure 1:
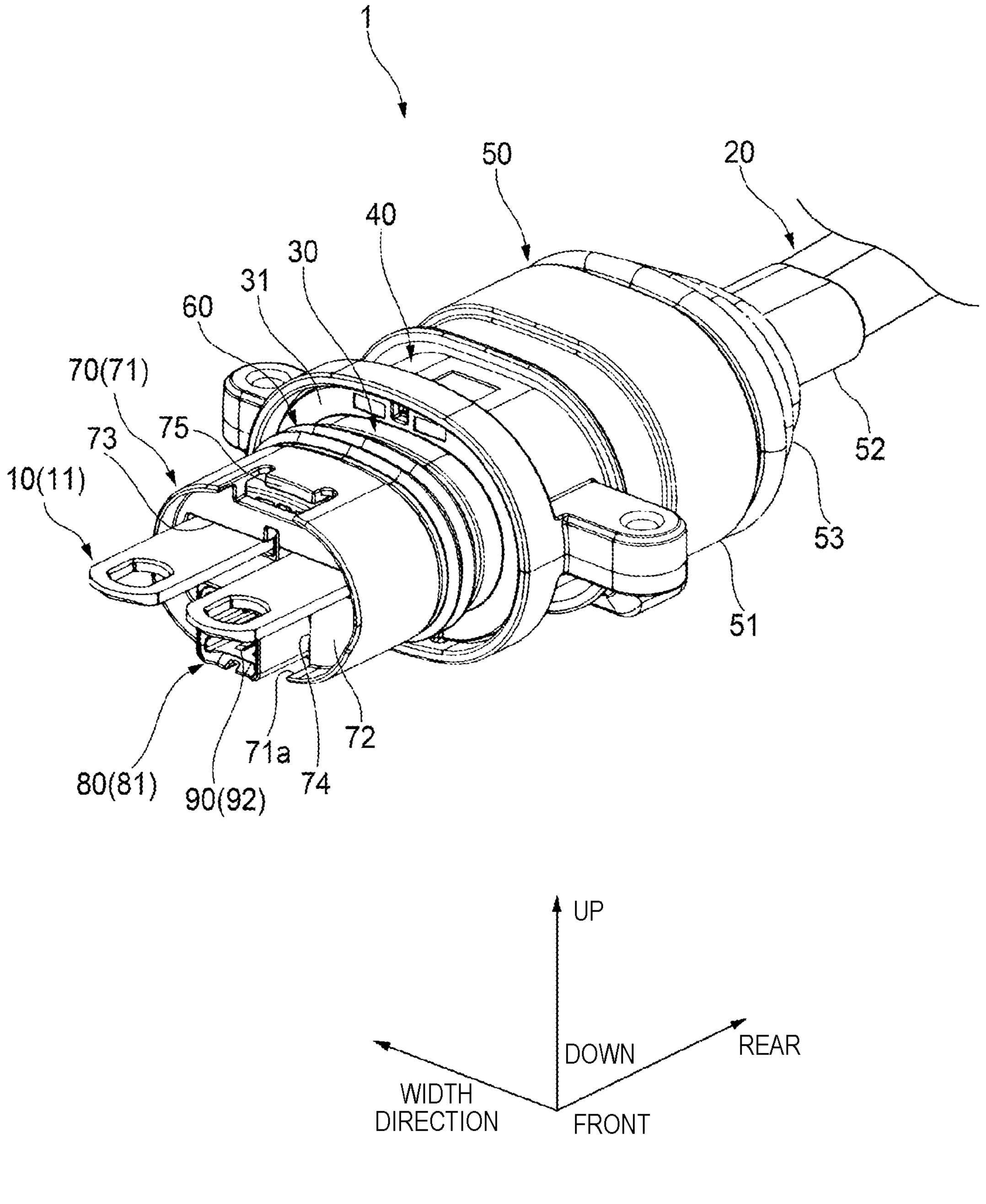
FIG. 1 is a perspective view showing a connector according to an embodiment of the present disclosure.

Hereinafter, for convenience of description, as shown in FIG. 1, etc., a "front-rear direction", an "upper-lower direction", and a "width direction" are defined. The "front-rear direction", the "upper-lower direction", and the "width direction" are orthogonal to each other. The front-rear direction coincides with a fitting direction of the connector 1 and the counterpart connector, and "front" and "rear" respectively correspond to an advancing side and a retreating side of the fitting of the connector 1 with the counterpart connector.

Figure 2:
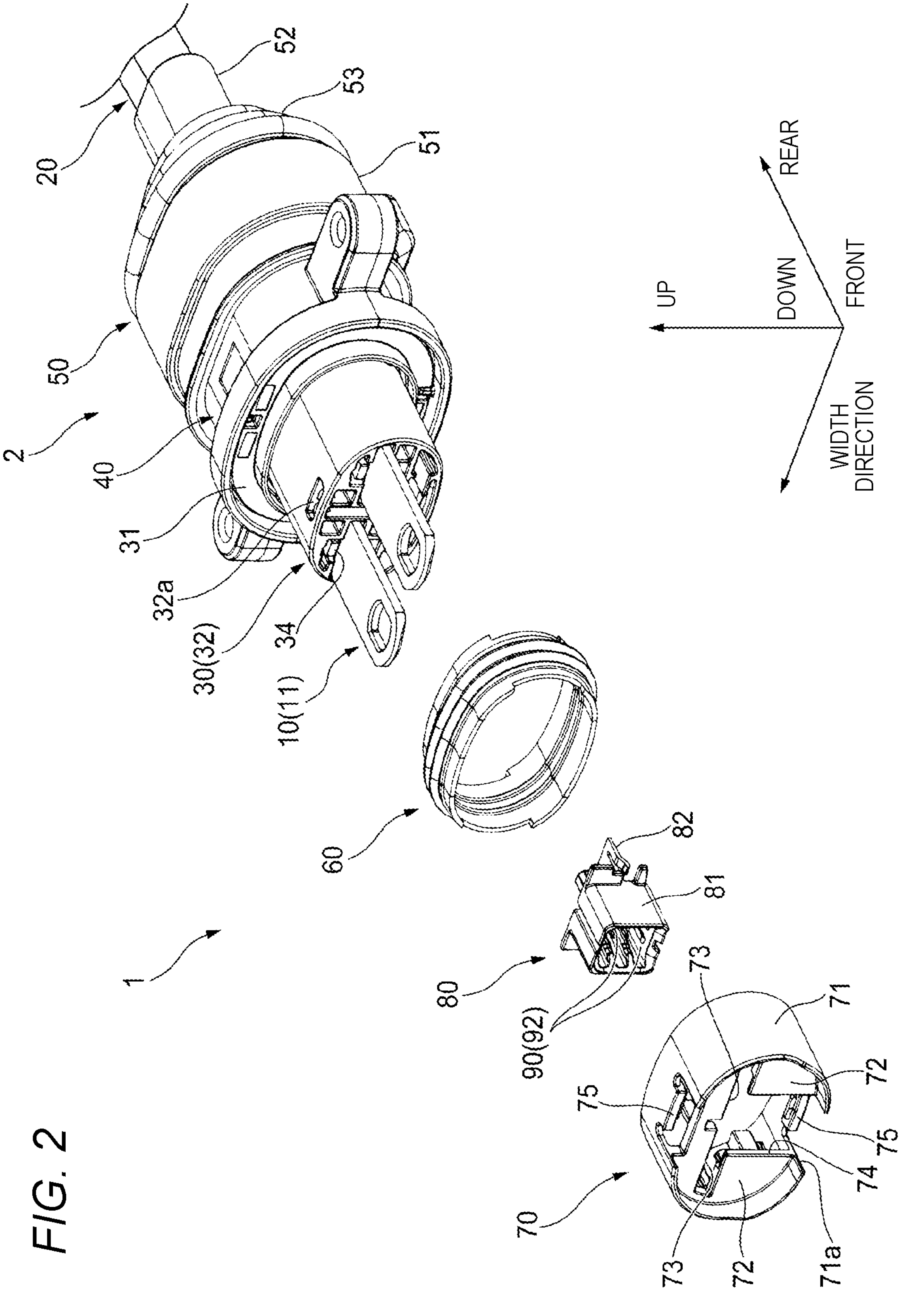
FIG. 2 is an exploded perspective view of the connector shown in FIG. 1.

As shown in FIGS. 1 and 2, the connector 1 includes a pair of terminal fittings 10, a pair of electric wires 20 connected to the pair of terminal fittings 10, a first housing 30 in which the pair of terminal fittings 10 is stored, a shield shell 40 mounted on the first housing 30 from a rear side, a boot 50 covering the shield shell 40 and the pair of electric wires 20, a packing 60 mounted on the first housing 30 from a front side, a front holder 70, and a second housing 80, and a short terminal 90 mounted on the second housing 80. Hereinafter, each member constituting the connector 1 will be described in order.

First, the terminal fitting 10 and the electric wire 20 will be described. The terminal fitting 10 is formed by performing pressing, bending and the like on a metal plate and has a shape extending in the front-rear direction. The terminal fitting 10 integrally includes an elongated flat plate-shaped terminal portion 11 (see FIGS. 1, 2, 8, etc.) extending in the front-rear direction, and a connection portion 12 (see FIG. 8) located at a rear end portion of the terminal portion 11. An end portion of the electric wire 20 is connected to the connection portion 12.

Figure 8:
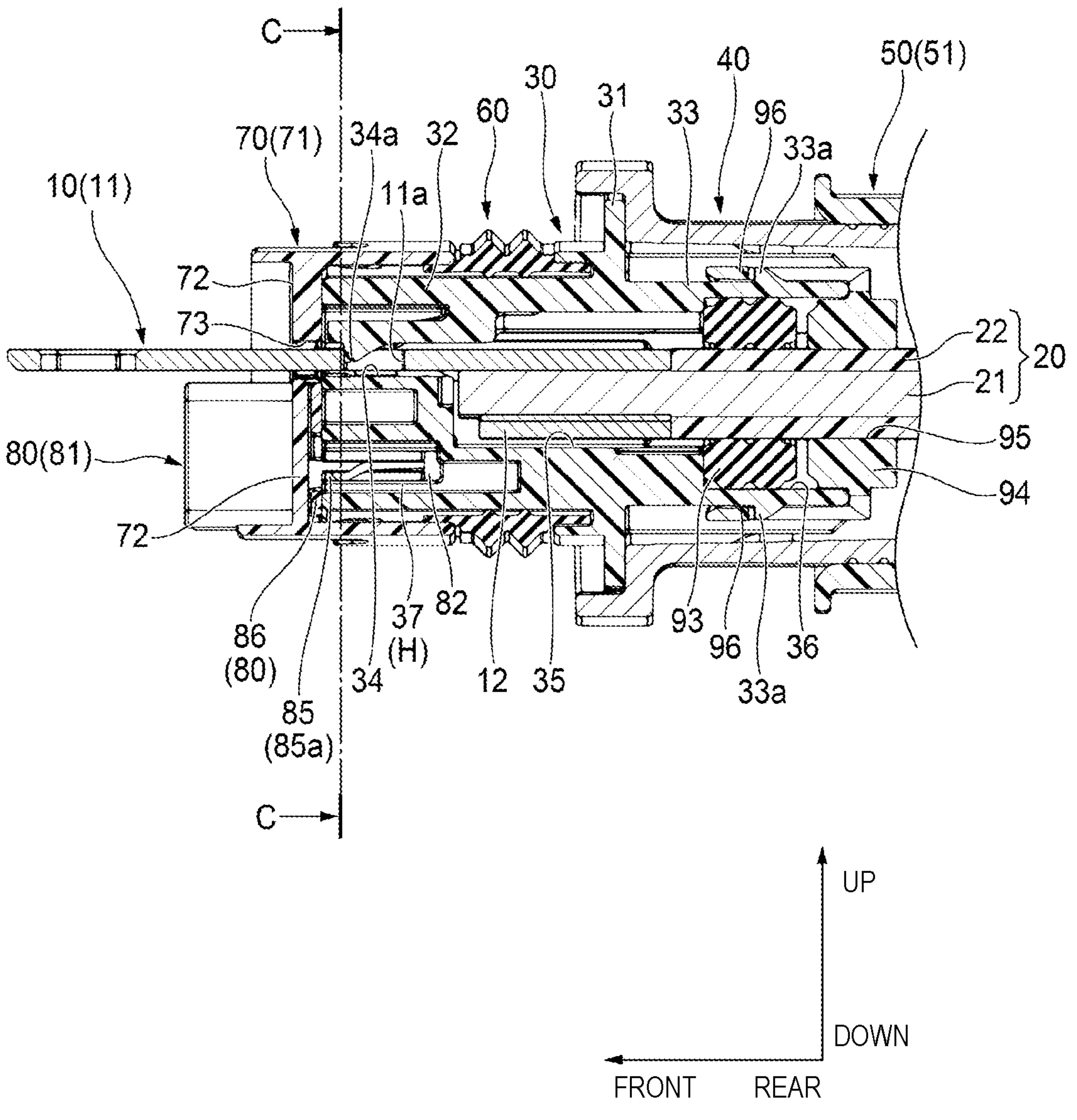
FIG. 8 is a cross-sectional view taken along a line B-B in FIG. 6.

As shown in FIG. 8, the electric wire 20 includes a conductor core wire 21 made of metal and an insulating sheath 22 covering the conductor core wire 21. At the end portion of the electric wire 20, the insulating sheath 22 is removed to expose the conductor core wire 21, and the connection portion 12 of the terminal fitting 10 is crimped and fixed to the exposed conductor core wire 21. Thus, the electric wire 20 connected to the terminal fitting 10 extends rearward from the connection portion 12 of the terminal fitting 10.

Figure 7:
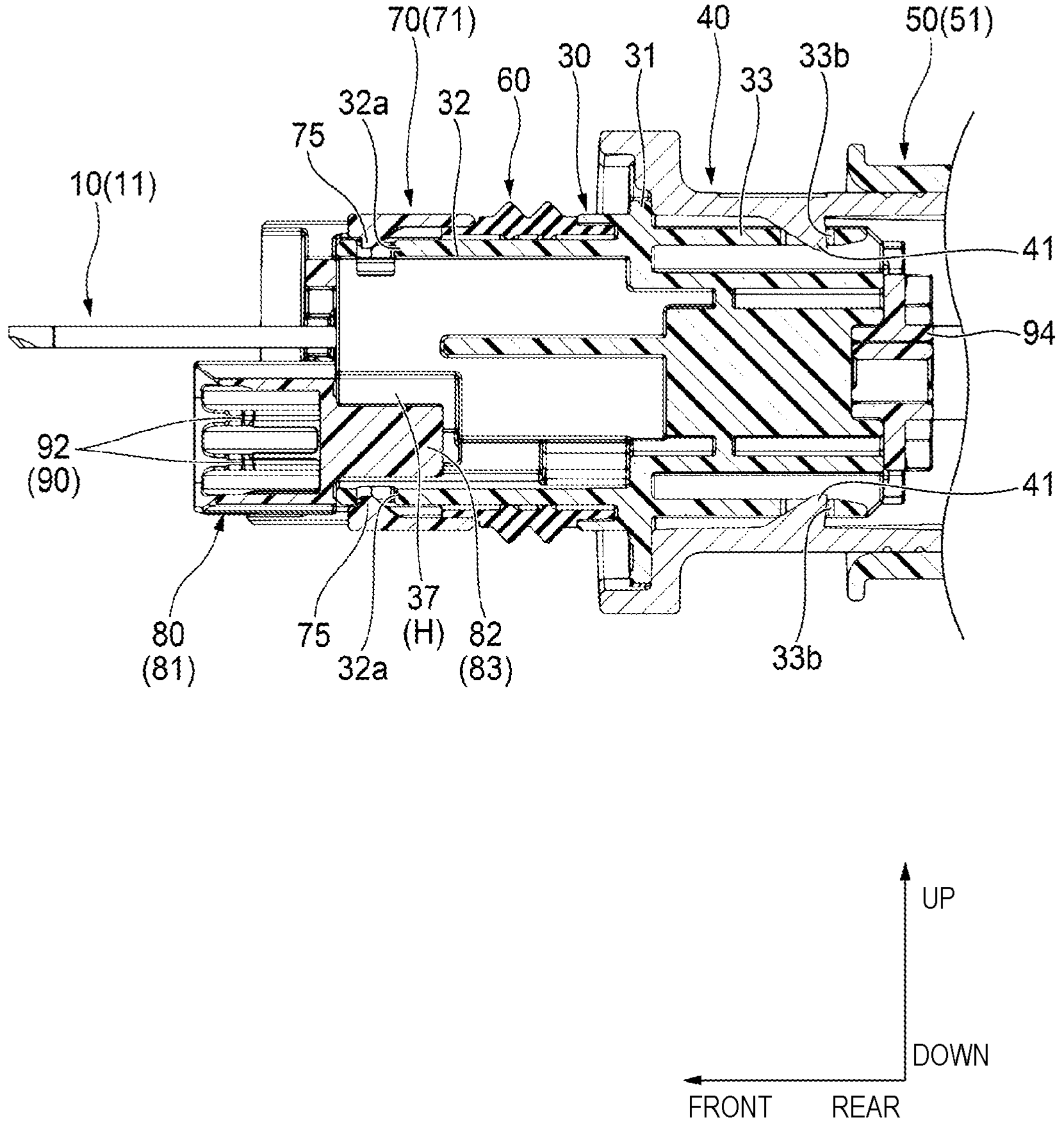
FIG. 7 is a cross-sectional view taken along a line A-A in FIG. 6.

Next, the first housing 30 will be described. The first housing 30 is a resin molded product. As shown in FIGS. 2, 7, 8, etc., the first housing 30 has a tubular shape extending in the front-rear direction, and has a flat shape elongated in a width direction when viewed in the front-rear direction. A flange portion 31 that protrudes radially outward is formed on an outer periphery of a central portion of the first housing 30 in the front-rear direction over the entire periphery. A portion of the first housing 30 on the front side of the flange portion 31 constitutes a fitting portion 32 that is inserted into and fitted to a tubular counterpart fitting portion (not shown) of the counterpart connector, and a portion of the first housing 30 on the rear side of the flange portion 31 constitutes an insertion portion 33 that is inserted into the shield shell 40 (see FIGS. 7 and 8).

In the first housing 30, a pair of terminal insertion holes 34, a pair of terminal storing chambers 35, and a pair of packing storing portions 36 are formed in this order from the front side toward the rear side at respective pairs of positions arranged at intervals in the width direction so as to communicate with each other in the front-rear direction. A front end of the terminal insertion hole 34 opens to a front end of the first housing 30 (a front end of the fitting portion 32), and a rear end of the packing storing portion 36 opens to a rear end of the first housing 30 (a rear end of the insertion portion 33).

The terminal portions 11 of the terminal fittings 10 are inserted into the terminal insertion holes 34, the connection portions 12 of the terminal fittings 10 are stored in the terminal storing chambers 35, and packings 93 (see FIG. 8), which will be described later, covering the outer peripheries of the pair of electric wires 20 are stored in the packing storing portions 36 (see FIG. 8).

Figure 9:
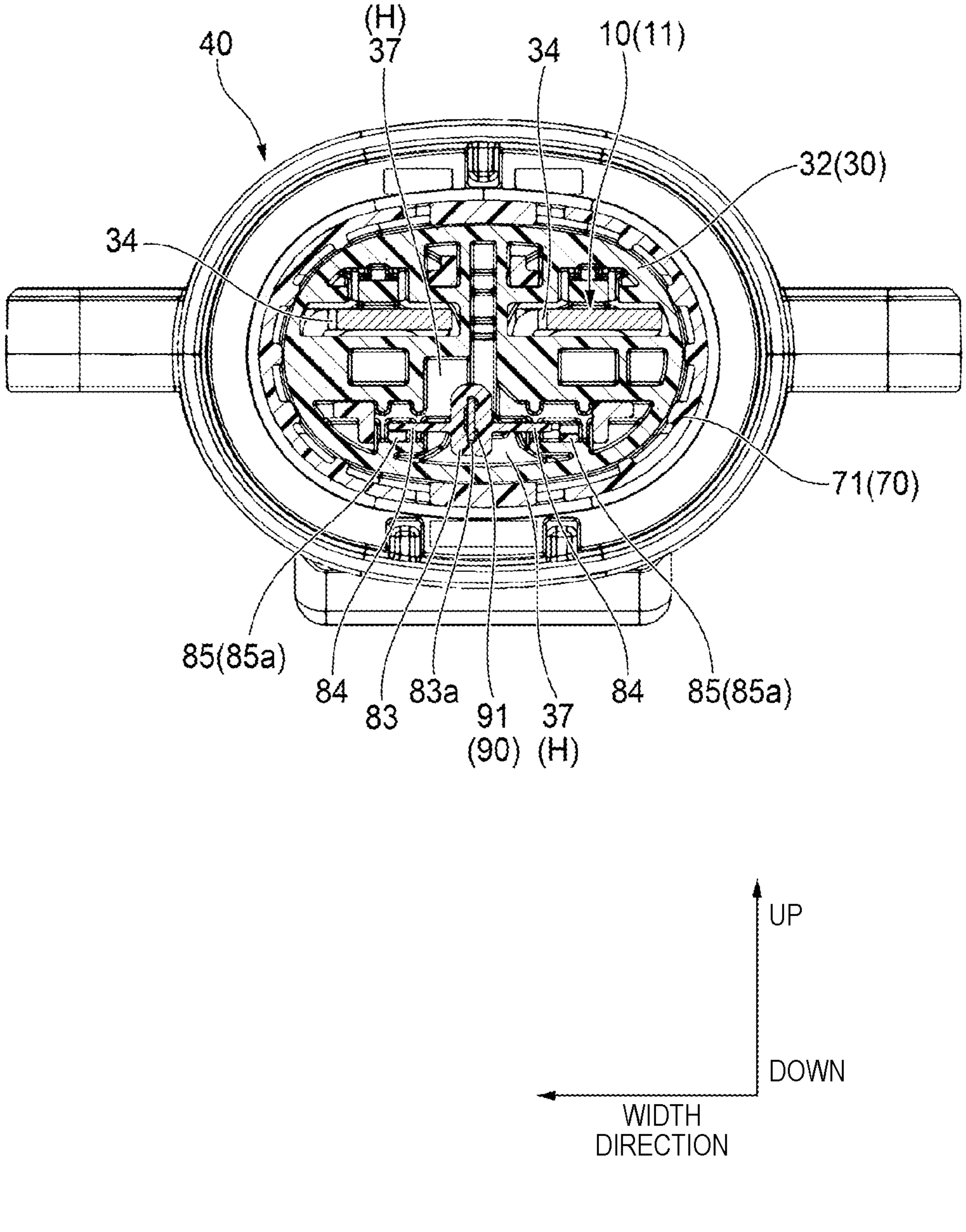
FIG. 9 is a cross-sectional view taken along a line C-C in FIG. 8.

A recessed portion 37 that opens forward and is recessed rearward is formed in lower portions of the pair of terminal insertion holes 34 in the fitting portion 32 of the first housing 30 (see FIGS. 7 to 9). A protruding portion 82 (see FIG. 3 and the like) of the second housing 80, which will be described later, is inserted into the recessed portion 37 (see FIGS. 7 to 9).

Next, the shield shell 40 will be described. As shown in FIGS. 1, 2, 7, and 8, the shield shell 40 made of metal has a tubular shape extending in the front-rear direction so as to be externally inserted into the insertion portion 33 of the first housing 30. The shield shell 40 is mounted to the insertion portion 33 of the first housing 30 from the rear side, and has a function of preventing electromagnetic noise from being transmitted to the pair of electric wires 20 located inside the first housing 30.

Next, the boot 50 will be described. As shown in FIGS. 1 and 2, the boot 50 made of rubber has a tubular shape extending in the front-rear direction, and integrally includes a large diameter portion 51 that covers an outer periphery of the shield shell 40, a small diameter portion 52 that covers the outer peripheries of the pair of electric wires 20 extending rearward from the shield shell 40, and a connecting portion 53 that connects the large diameter portion 51 and the small diameter portion 52. The boot 50 has a function of protecting the pair of electric wires 20 extending rearward from the shield shell 40.

The pair of terminal fittings 10, the pair of electric wires 20, the first housing 30, the shield shell 40, and the boot 50 described above constitute a subassembly 2 (see FIG. 2), which is a part of the connector 1. The subassembly 2 is assembled in the following procedure.

First, by inserting the end portions of the pair of electric wires 20 into hollow portions of the boot 50 and the shield shell 40 in this order from the rear side, the pair of electric wires 20 is inserted into the boot 50 and the shield shell 40. Next, the pair of electric wires 20 is inserted through a holder 94 (see FIGS. 7 and 8). A pair of through holes 95 (see FIG. 8) is formed in the holder 94 made of resin so as to be spaced apart from each other in the width direction. By inserting the end portions of the pair of electric wires 20 into the pair of through holes 95 from the rear side, the pair of electric wires 20 is inserted through the holder 94. Next, each of the pair of electric wires 20 is inserted through the annular packings 93 made of rubber (see FIG. 8). Next, the connection portions 12 of the terminal fittings 10 are crimped and fixed to the exposed conductor core wires 21 at the end portions of each of the electric wires 20.

Next, the pair of terminal fittings 10 to which the pair of electric wires 20 is connected is stored in the first housing 30. Therefore, each terminal fitting 10 is inserted into the first housing 30 from the rear side. As a result, the terminal portions 11 are inserted into the respective terminal insertion holes 34, and the connection portions 12 are stored in the respective terminal storing chambers 35. In a state in which the terminal fittings 10 are completed inserted, front portions of the pair of terminal portions 11 protrude forward from the front end of the first housing 30 (the front end of the fitting portion 32) (see FIG. 2), and the pair of electric wires 20 extending rearward from the pair of terminal fittings 10 extends rearward from the rear end of the first housing 30 (the rear end of the insertion portion 33). In the state in which the terminal fittings 10 is completed inserted, as shown in FIG. 8, a locking hole 11*a* provided in the terminal portion 11 and a locking protrusion 34*a* provided in the terminal insertion hole 34 are engaged with each other, so that the terminal fittings 10 are prevented from coming out to the rear side from the first housing 30.

Next, the pair of packings 93 through which the pair of electric wires 20 is inserted is relatively moved toward the front side with respect to the pair of electric wires 20 to be stored in the pair of packing storing portions 36 of the first housing 30, and the holder 94 through which the pair of electric wires 20 is inserted is relatively moved toward the front side with respect to the pair of electric wires 20 to be mounted on the rear end of the first housing 30 (the rear end of the insertion portion 33). In a state in which the packings 93 are completely stored, the packings 93 are pressed and sandwiched between outer peripheral surfaces of the electric wires 20 and inner peripheral surfaces of the packing storing portions 36 (see FIG. 8), and have a function of sealing a gap between the electric wires 20 and the packing storing portions 36. In a state in which the holder 94 is completely mounted, as shown in FIG. 8, a locking hole 96 provided in the holder 94 and a locking protrusion 33*a* provided on an outer periphery of the insertion portion 33 are engaged with each other, so that the holder 94 is prevented from falling off to the rear side from the first housing 30. The holder 94 is disposed adjacent to the pair of packings 93 on the rear side, so as to function to prevent the pair of packings 93 from falling off to the rear side from the first housing 30.

Next, the shield shell 40 through which the pair of electric wires 20 is inserted is mounted to the insertion portion 33 of the first housing 30 from the rear side. Therefore, the shield shell 40 is externally inserted into the insertion portion 33 of the first housing 30. In a state in which the shield shell 40 is completely mounted, as shown in FIG. 7, a locking piece 41 provided in the shield shell 40 and a locking hole 33*b* provided in an outer periphery of the insertion portion 33 are engaged with each other, so that the shield shell 40 is prevented from falling off to the rear side from the first housing 30.

Next, the boot 50 through which the pair of electric wires 20 is inserted is relatively moved forward with respect to the pair of electric wires 20, and the large diameter portion 51 of the boot 50 is mounted on the outer periphery of the shield shell 40. As a result, the mounting of the boot 50 is completed, and assembling the subassembly 2 is completed, so that the subassembly 2 shown in FIG. 2 is obtained.

Next, the packing 60 will be described. As shown in FIG. 2, the rubber packing 60 made of rubber has a tubular shape extending in the front-rear direction, and has a flat shape elongated in the width direction corresponding to an outer peripheral shape of the fitting portion 32 of the first housing 30 when viewed in the front-rear direction. The packing 60 is mounted on an outer periphery of the fitting portion 32 of the subassembly 2 from the front side (see FIGS. 1, 7, etc.). In a state in which the tubular counterpart fitting portion of the counterpart connector is externally inserted into the fitting portion 32 by fitting of the connector 1 and the counterpart connector, the packings 60 mounted on the fitting portion 32 are pressed and sandwiched between an outer peripheral surface of the fitting portion 32 and an inner peripheral surface of the counterpart fitting portion. This provides a function of sealing a gap between the fitting portion 32 and the counterpart fitting portion.

Figure 3:
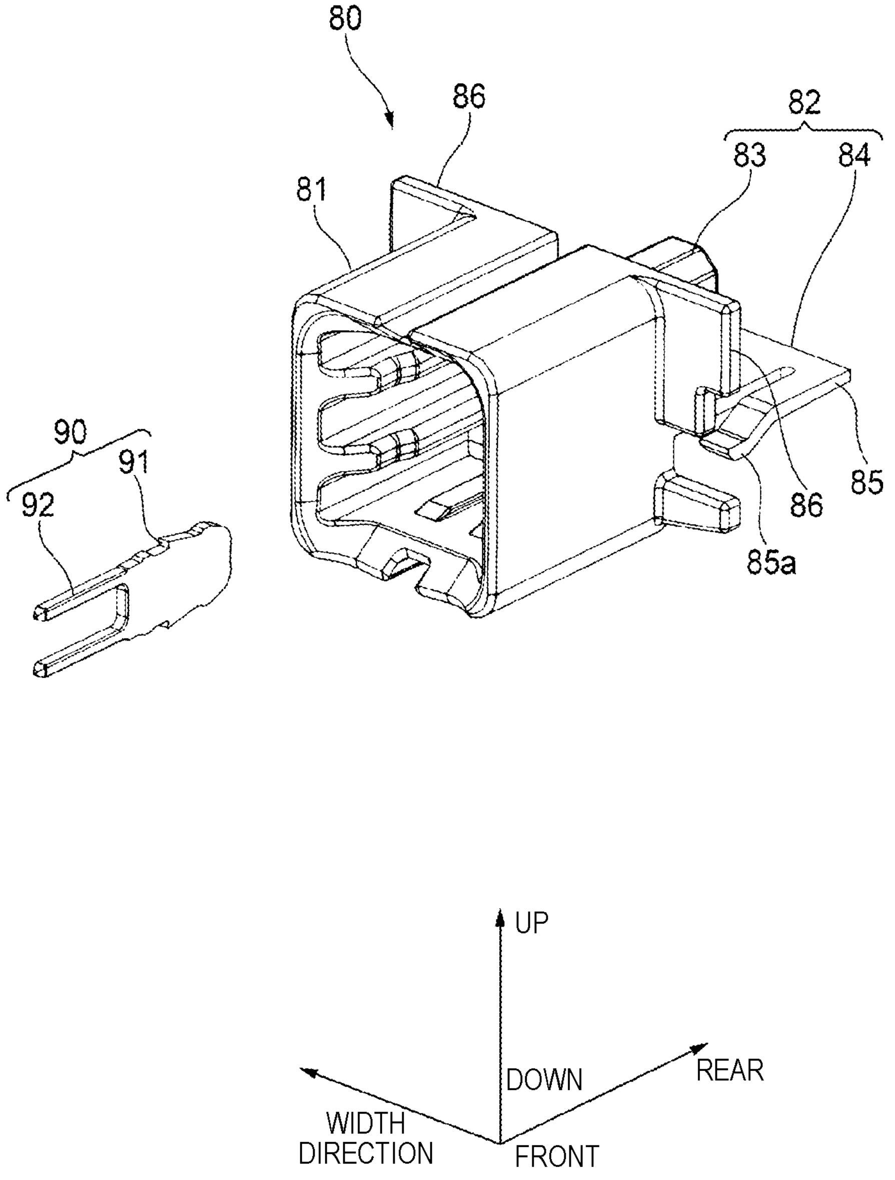
FIG. 3 shows a second housing and a short terminal shown in FIG. 2.

Next, the second housing 80 and the short terminal 90 will be described. The second housing 80 is a resin molded product, and has a function of holding the short terminal 90 that provides a function of detecting a fitting state with the counterpart connector. As shown in FIG. 3, the short terminal 90 integrally includes a flat plate-shaped base portion 91 extending in the front-rear direction and the upper-lower direction, and a pair of rod-shaped terminal portions 92 extending forward from upper and lower ends of a front end of the base portion 91.

Figure 4:
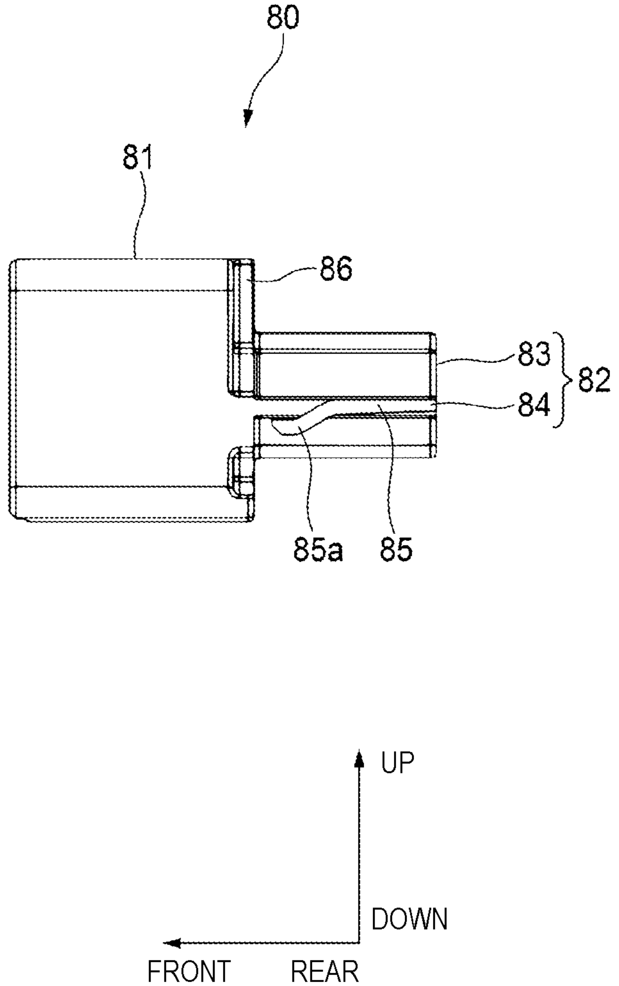
FIG. 4 is a side view of the second housing.
Figure 5:
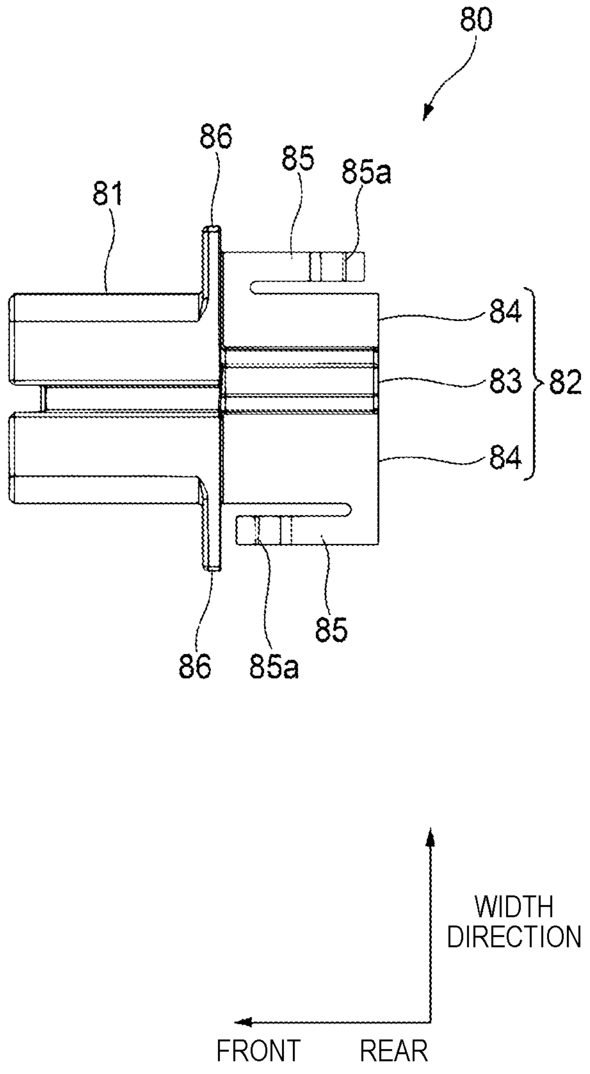
FIG. 5 is a top view of the second housing.

As shown in FIGS. 3 to 5, the second housing 80 includes a rectangular tubular main body portion 81 extending in the front-rear direction. The main body portion 81 opens to the front side, and the rear side is closed by a rear wall (not shown). When the connector 1 and the counterpart connector are fitted with each other, a fitting protrusion for fitting detection (not shown) of the counterpart connector is inserted into an internal space of the main body portion 81.

The main body portion 81 is integrally provided with the protruding portion 82 that protrudes rearward from a rear wall of the main body portion 81. The protruding portion 82 includes a central protruding portion 83 that protrudes rearward from a central portion of the rear wall of the main body portion 81 in the width direction and extends in the upper-lower direction, and a pair of flat plate portions 84 that extends to both sides in the width direction from a central portion of the central protruding portion 83 in the upper-lower direction and extends forward from the rear wall of the main body portion 81. A cantilevered elastic piece 85 extending in the front-rear direction is integrally formed at an outer end edge in the width direction of each flat plate portion 84. Positions of fixed ends and free ends of the elastic piece 85 on one side in the width direction and of the elastic piece 85 on the other side in the width direction are opposite to each other in the front-rear direction. A protrusion 85*a* protruding downward is formed at the free end of each elastic piece 85. The main body portion 81 is formed with a pair of flat plate-shaped flange portions 86 that is continuous from the rear wall of the main body portion 81, protrudes toward both sides in the width direction, and extends in the upper-lower direction.

A press-fit recessed portion 83*a* that opens to the front side and is recessed to the rear side is formed inside the central protruding portion 83 (see FIG. 9). The press-fit recessed portion 83*a* communicates with the internal space of the main body portion 81 in the front-rear direction. The base portion 91 (see FIG. 3) of the short terminal 90 is press-fitted into the press-fit recessed portion 83*a* from the front side. Thus, the short terminal 90 is fixed to the second housing 80 such that the pair of terminal portions 92 protrudes forward from the rear wall of the main body portion 81 and is positioned in the internal space of the main body portion 81.

The second housing 80 is mounted on the first housing 30 by inserting the protruding portion 82 (the central protruding portion 83 and the pair of flat plate portions 84) into the recessed portion 37 of the first housing 30 in the subassembly 2 from the front side (see FIGS. 7 to 9). In a state in which the protruding portion 82 is inserted into the recessed portion 37 of the first housing 30, as shown in FIGS. 7 to 9, a gap H is formed around a side face of the protruding portion 82, so that the protruding portion 82 (that is, the second housing 80) can be displaced in any direction perpendicular to the front-rear direction with respect to the recessed portion 37 (that is, the first housing 30). When the second housing 80 is moved downward with respect to the first housing 30 in a state where the protruding portion 82 is inserted into the recessed portion 37 of the first housing 30, the protrusions 85*a* of the pair of elastic pieces 85 come into contact with a bottom wall of the recessed portion 37. When the second housing 80 is pressed downward from this state, the pair of elastic pieces 85 are elastically deformed upward by an upward force received by the pair of protrusions 85*a* from the bottom wall of the recessed portion 37, and the second housing 80 is pushed back upward by a downward elastic restoring force of the pair of elastic pieces 85.

Next, the front holder 70 will be described. The front holder 70 has a function of preventing the packings 60 and the second housing 80 from falling off to the front side from the first housing 30. The front holder 70 is a resin molded product and includes a tubular portion 71 as shown in FIG. 2. The tubular portion 71 has a tubular shape extending in the front-rear direction, and has a flat shape elongated in the width direction corresponding to the outer peripheral shape of the fitting portion 32 of the first housing 30 when viewed in the front-rear direction. A rectangular notch 71*a* recessed toward the rear side from a front end of the tubular portion 71 is formed in the central portion of a lower portion of the tubular portion 71 in the width direction. The notch 71*a* is provided to prevent interference between the main body portion 81 of the second housing 80 and the front holder 70.

In the tubular portion 71, a flat plate-shaped partition wall 72 is formed at a position on the front side of the center of the tubular portion 71 in the front-rear direction so as to partition an internal space of the tubular portion 71 into front and rear spaces. Slits 73 (through holes) extending in the width direction through which the terminal portions 11 of the pair of terminal fittings 10 are inserted are formed in the partition wall 72. A rectangular notch 74 is formed in the partition wall 72 at a central portion in the width direction of a lower portion of the slit 73. An upper end of the notch 74 communicates with the slits 73, and a lower end of the notch 74 communicates with the notch 71*a*. Similarly to the notch 71*a*, the notch 74 is also provided to prevent interference between the main body portion 81 of the second housing 80 and the front holder 70.

In a state where the packings 60 and the second housing 80 are mounted on the subassembly 2, the front holder 70 is mounted on the outer periphery of the fitting portion 32 from the front side such that the terminal portions 11 of the pair of terminal fittings 10 are inserted through the slits 73 and the main body portion 81 of the second housing 80 passes through the notch 74 (see FIGS. 1, 7, etc.).

In a state in which the front holder 70 is completely mounted, front portions of the terminal portions 11 of the pair of terminal fittings 10 and front portion of the main body portion 81 of the second housing 80 protrude forward from the partition wall 72 of the front holder 70. In other words, the pair of terminal portions 11 and the pair of terminal portions 92 of the short terminal 90 fixed to the second housing 80 are exposed forward. In the state in which the front holder 70 is completely mounted, as shown in FIG. 7, the locking hole 32*a* provided on the outer periphery of the fitting portion 32 and the locking protrusion 75 provided on the front holder 70 are engaged with each other, so that the front holder 70 is prevented from coming out to the front side from the first housing 30.

As can be understood from FIG. 8, in the state in which the front holder 70 is completely mounted, the tubular portion 71 is disposed adjacent to the front side of the packing 60, so that the packing 60 is prevented from falling off to the front side from the first housing 30; and the pair of flange portions 86 of the second housing 80 is sandwiched in the front-rear direction by the front end of the first housing 30 (the front end of the fitting portion 32) and the partition wall 72 of the front holder 70, so that the front holder 70 is prevented from falling off to the front side from the first housing 30. As described above, after the front holder 70 is completed mounted, assembling the connector 1 is completed, and the connector 1 shown in FIG. 1 is obtained. The members constituting the connector 1 have been described above.

Figure 6:
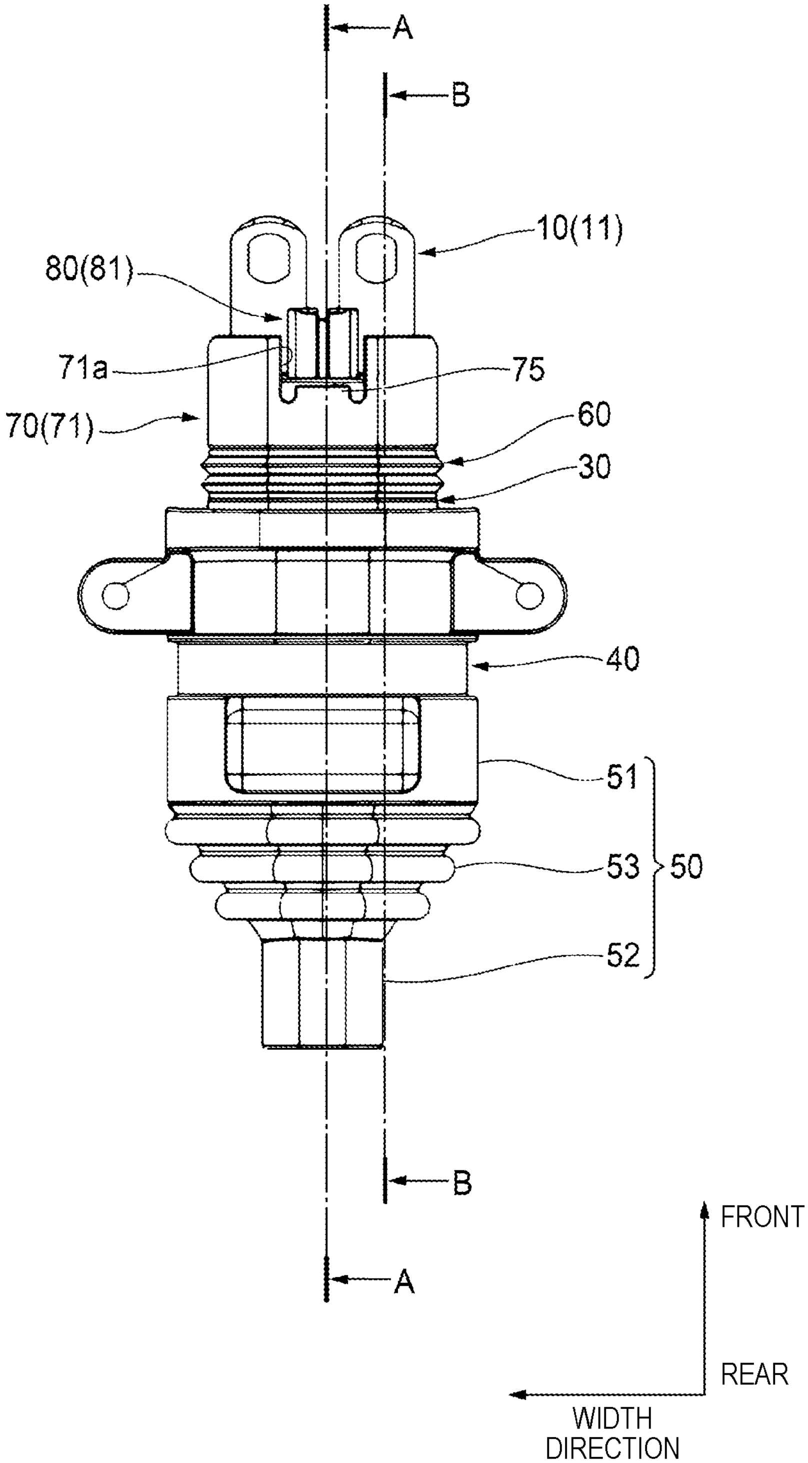
FIG. 6 is a bottom view of the connector shown in FIG. 1 (electric wires are not shown).

In an assembled state of the connector 1, even when the second housing 80 is displaced in any direction perpendicular to the front-rear direction with respect to the first housing 30 within a range of the above-described gap H (see FIGS. 7 to 9), the main body portion 81 of the second housing 80 does not interfere with an edge portion of the notch 71*a* and an edge portion of the notch 74 of the front holder 70 (see FIG. 6). That is, the second housing 80 attached to the fitting portion 32 (recessed portion 37) of the first housing 30 can be displaced in any direction perpendicular to the front-rear direction with respect to the first housing 30 within the range of the gap H while maintaining a posture in which the pair of terminal portions 92 of the short terminal 90 faces the counterpart connector.

The assembled connector 1 is fitted to the counterpart connector. In order to fit the connector 1 and the counterpart connector to each other, a tubular counterpart fitting portion of the counterpart connector is externally inserted into the fitting portion 32 of the connector 1. As the counterpart fitting portion is externally inserted into the fitting portion 32, the fitting protrusion for fitting detection provided on the counterpart fitting portion is inserted into the internal space of the main body portion 81 of the second housing 80. A pair of female terminal portions (not shown) corresponding to the pair of terminal portions 92 of the short terminal 90 is stored in the fitting protrusion for fitting detection. The pair of female terminal portions is connected to a signal circuit for fitting detection provided in the counterpart connector. In a state in which the pair of female terminal portions is not respectively connected to the pair of terminal portions 92 of the short terminal 90, the signal circuit for fitting detection is disconnected.

When the connector 1 and the counterpart connector are fitted to each other, the fitting protrusion for fitting detection of the counterpart connector is inserted into the internal space of the main body portion 81, so that the pair of terminal portions 92 of the short terminal 90 and the pair of female terminal portions are electrically connected to each other. As a result, the signal circuit for fitting detection is connected. In this way, by electrically detecting the transition from the disconnection to the connection of the signal circuit for fitting detection, the fitting of the connector 1 and the counterpart connector is detected.

Here, as described above, in the connector 1, the second housing 80, in which the short terminal 90 is stored, is displaceable with respect to the first housing 30 in any direction perpendicular to the front-rear direction within the range of the gap H with respect to the first housing 30 (fitting portion 32). Therefore, when the connector 1 and the counterpart connector are fitted to each other, even if a positional deviation (a positional deviation in a direction perpendicular to the front-rear direction) occurs between the terminal portions 92 of the short terminal 90 and the female terminal portions of the counterpart connector due to a manufacturing tolerance of the connector 1, a manufacturing tolerance of the counterpart connector, or the like, the positional deviation can be absorbed by relatively moving the second housing 80 with respect to the first housing 30 (the fitting portion 32) in a direction in which the positional deviation disappears.

Further, in a case where the counterpart connector is not provided with the signal circuit for fitting detection (including the fitting protrusion for fitting detection and the pair of female terminal portions), the connector 1 can be changed to a structure that does not include the short terminal 90 by simply omitting the attachment of the second housing 80, in which the short terminal 90 is stored, to the first housing 30 without changing the shape and the like of other members constituting the connector 1.

Functions and Effects

As described above, according to the connector 1 of the present embodiment, the second housing 80 having the short terminal 90 is attached to the first housing 30 separately from the first housing 30 constituting the fitting part (fitting portion 32) to be fitted to the counterpart connector. The second housing 80 is attached to the first housing 30 in a state in which the second housing 80 is displaceable in a direction intersecting the fitting direction with the mating connector in a posture in which the short terminal 90 faces the counterpart connector. Therefore, displacement of the second housing 80 can absorb positional displacement due to manufacturing tolerance or the like. Therefore, in the connector 1 according to the present embodiment, the alignment of the short terminal 90 is easy.

Further, the protruding portion 82 of the second housing 80 is inserted into the recessed portion 37 of the first housing 30, and there is a displacement gap (gap H) between the protruding portion 82 and the inner wall of the recessed portion 37, so that the second housing 80 can be displaced in the direction intersecting the fitting direction. Thus, the second housing 80 can be attached to the first housing 30 in a displaceable manner.

Further, the second housing 80 is attached to the fitting part (fitting portion 32) of the first housing 30, so that the connector 1 can be downsized as compared with a case where the second housing 80 is attached to another position of the first housing 30.

Other Embodiments

The present disclosure is not limited to the above embodiment, and various modifications can be adopted within the scope of the present invention. For example, the present disclosure is not limited to the above embodiment, and may be appropriately modified, improved or the like. In addition, materials, shapes, dimensions, numerals, disposition locations or the like of constituent elements in the above embodiment are optional and not limited as long as the object of the present disclosure can be achieved.

In the above embodiment, in the state in which the protruding portion 82 of the second housing 80 is inserted into the recessed portion 37 of the first housing 30, the gap H is formed around the side face of the protruding portion 82, so that the second housing 80 is displaceable in any direction perpendicular to the front-rear direction with respect to the first housing 30. In this regard, the second housing 80 may be attached to the first housing 30 by any structure as long as the second housing 80 can be displaced with respect to the first housing 30 in any direction perpendicular to the front-rear direction.

Further, in the above embodiment, the second housing 80 is attached to the fitting part (fitting portion 32) of the first housing 30. Alternatively, the second housing 80 may be attached to a part of the first housing 30 other than the fitting part (fitting portion 32).

Here, the connector 1 according to the embodiment of the present disclosure described above will be briefly summarized and listed in [1] to [3] below.

[1] A connector (1) including:

a terminal fitting (10);

an electric wire (20) connected to the terminal fitting (10);

a first housing (30) in which the terminal fitting (10) is stored, the first housing (30) constituting a fitting part (32) with a counterpart connector;

a seal member (60) disposed so as to surround an outer periphery of the first housing (30);

a front holder (70) mounted on the first housing (30) so as to prevent the seal member (60) from coming out from the first housing (30); and a second housing (80) including a short terminal (90), the short terminal (90) being configured to allow a fitting state with the counterpart connector to be detected, wherein the second housing (80) is attached to the first housing (30) and retained by the front holder (70) in a state in which the second housing (80) is displaceable in a direction intersecting a fitting direction with the counterpart connector in a posture in which the short terminal (90) faces the counterpart connector.

According to the connector having the configuration [1], the second housing having the short terminal is attached to the first housing separately from the first housing constituting a fitting part with the counterpart connector. The second housing is attached to the first housing in a state in which the second housing is displaceable in a direction intersecting the fitting direction with the mating connector in a posture in which the short terminal faces the counterpart connector. Therefore, displacement of the second housing can absorb positional displacement due to manufacturing tolerance or the like. Therefore, in the connector of the present configuration, the alignment of the short terminal is easy.

[2] The connector (1) according to [1], wherein the second housing (80) includes a protruding portion (82) protruding in a direction away from the counterpart connector, wherein the first housing (30) has a recessed portion (37) into which the protruding portion (82) is inserted, wherein the protruding portion (82) and an inner wall of the recessed portion (37) define a displacement gap (H) therebetween, and wherein the displacement gap (H) allows the second housing (80) to be displaced in a direction intersecting the fitting direction.

According to the connector having the configuration [2], the protruding portion of the second housing is inserted into the recessed portion of the first housing, and the displacement gap is defined between the protruding portion and the inner wall of the recessed portion, so that the second housing is displaceable in the direction intersecting the fitting direction. Thus, the second housing can be attached to the first housing in a displaceable manner.

[3] The connector (1) according to [1] or [2], wherein the second housing (80) is attached to the fitting part (32) of the first housing (30).

According to the connector having the configuration [3], the second housing is attached to the fitting part of the first housing, so that the size of the connector as a whole can be reduced as compared with a case where the second housing is attached to another part.

What is claimed is:

1. A connector comprising:

a terminal fitting;

an electric wire connected to the terminal fitting;

a first housing in which the terminal fitting is stored, the first housing constituting a fitting part that is configured to be inserted into a counterpart connector in a fitting direction;

a seal member disposed so as to surround an outer periphery of the first housing;

a front holder mounted on the first housing so as to prevent the seal member from coming out from the first housing in the fitting direction; and a second housing comprising a short terminal, the short terminal being configured to allow a fitting state with the counterpart connector to be detected, wherein the second housing is attached to the first housing and retained by the front holder in a state in which the second housing is displaceable in a direction intersecting the fitting direction and in a posture in which the short terminal faces the counterpart connector, and wherein the second housing is spaced away from the seal member.

2. The connector according to claim 1, wherein the second housing comprises a protruding portion protruding in a direction away from the counterpart connector, wherein the first housing has a recessed portion into which the protruding portion is inserted, wherein the protruding portion and an inner wall of the recessed portion define a displacement gap therebetween, and wherein the displacement gap allows the second housing to be displaced in the direction intersecting the fitting direction.

3. The connector according to claim 1, wherein the second housing is attached to the fitting part of the first housing.

4. The connector according to claim 1, wherein the front holder retains the second housing with respect to the first housing in the fitting direction.

5. The connector according to claim 1, wherein the second housing includes a flange portion that is sandwiched between the first housing and the front holder in the fitting direction, wherein the second housing includes an opening that is spaced away from first housing and the short terminal extends toward the opening in the fitting direction.

6. The connector according to claim 1, wherein the second housing includes a pair of elastic pieces that bias the second housing relative to the first housing in a direction that is orthogonal to the fitting direction.

7. The connector according to claim 1, wherein the short terminal is electrically disconnected from the terminal fitting, and wherein the terminal fitting is outside of the second housing.

* * * * *